March 13, 1962 — H. W. ASCHINGER — 3,025,019
CABLE REEL ASSEMBLY
Filed Aug. 24, 1959 — 2 Sheets-Sheet 1

INVENTOR.
Harold W. Aschinger

March 13, 1962 H. W. ASCHINGER 3,025,019
CABLE REEL ASSEMBLY
Filed Aug. 24, 1959 2 Sheets-Sheet 2

INVENTOR.
Harold W. Aschinger
BY Karl Huber Attorney
John G. Kovalcik Agent

United States Patent Office 3,025,019
Patented Mar. 13, 1962

3,025,019
CABLE REEL ASSEMBLY
Harold W. Aschinger, Ridgefield, N.J., assignor, by mesne assignments, to Vare Industries, Roselle, N.J., a corporation of New Jersey
Filed Aug. 24, 1959, Ser. No. 835,472
5 Claims. (Cl. 242—82)

The present invention deals with a cable reel assembly and more particularly with a cable reel assembly for electrically conductive cables.

Conventional reels for electrically conductive cables usually require the use of electrical slip-ring assemblies to serve between a rotating reel and a cable junction for signal transmission. While such electrical transmission means is satisfactory for certain electric requirements, it is not altogether satisfactory where high frequency electrical components are involved, and special type electrical transmission assemblies are required for satisfactory performance.

It is an object of the invention to provide a cable reel assembly for electrical conductive cables and adapted to perform without the use of slip-ring assemblies.

It is another object of the invention to provide a cable reel assembly for underwater application.

It is a further object of the invention to provide a cable reel assembly especially adapted for electrical conductive cables serving high frequency electrical components.

Figure 1:
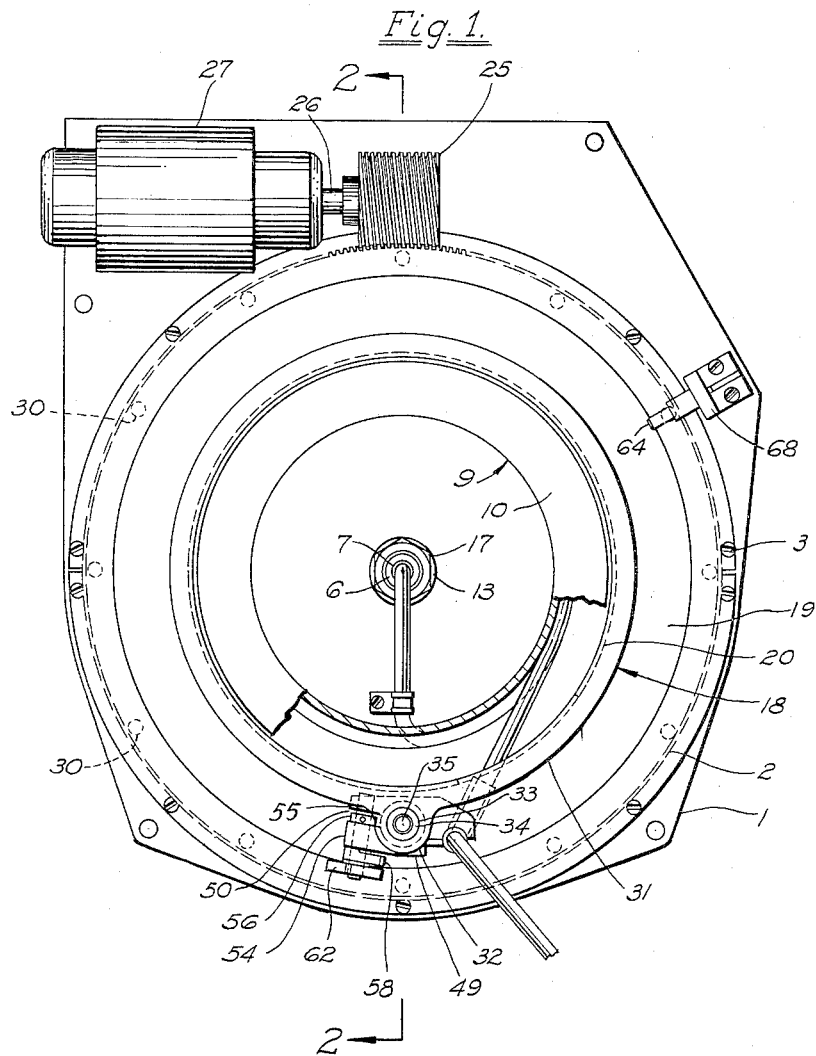
Figure 2:
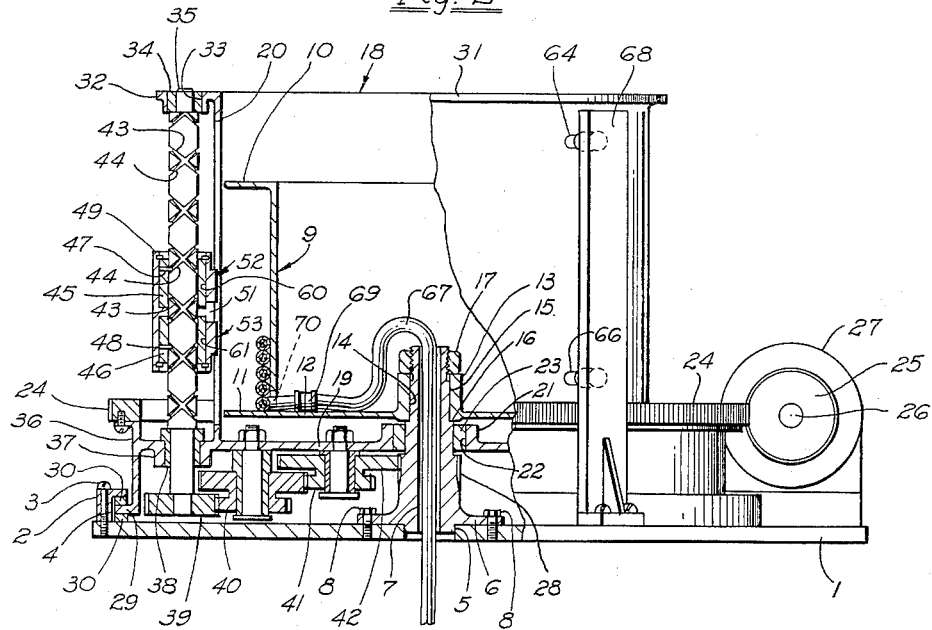
Figure 3:
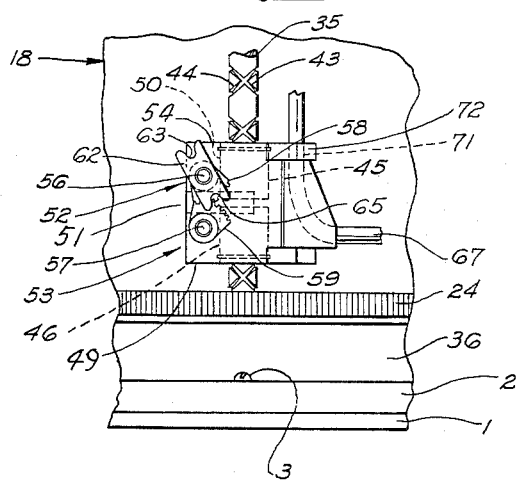

Other objects and advantages of the invention will become apparent from the description hereinafter following and the drawings forming a part hereof, in which:

FIGURE 1 illustrates a partly elevational and partly sectional top view of the cable reel assembly of the invention, FIGURE 2 illustrates a partly elevational and partly cross-sectional view along lines 2—2 of FIGURE 1, and FIGURE 3 illustrates a fragmentary side view of a part of the assembly.

The invention deals with a cable reel assembly for electrically conductive cables and concerns means for winding the cables on a fixed drum and thereby eliminating the use of electrical slip-ring assemblies or other special electrical contact components, whereby the cable is connected directly between the source of electrical energy and the electrical apparatus being served.

Regarding the illustrations, the invention comprises a base 1 having a ring 2 mounted thereon by means of bolts 3. The ring 2 is provided with an annular groove 4, the groove facing the ring axis. The base 1 is provided with an aperture 5 therethrough and a sleeve 6 having a bore 7 therethrough, is fixed to the base 1 by means of bolts 8, the sleeve extending upwardly of the base and communicating with aperture 5. A hollow cylindrical drum 9 having flanges 10 and 11 extending outwardly of its ends and having one end thereof covered with a plate 12 is mounted on sleeve 6. The plate 12 is provided with a central hub 13 mounted through the plate 12 and having an axial opening 14 therethrough. The sleeve 6 is provided with a reduced end portion 15 forming a seat 16 with the hub 13 abutting the seat 16 when the drum 9 is mounted on the sleeve 6. The sleeve 6 extends through the plate 12 into the cavity of drum 9. The end of the sleeve 6 is threaded and the nut 17 is screwed over the end of the sleeve 6 securing the hub 13 to the sleeve 6, whereby the drum 9 is fixed in stationary position.

A cylindrical hollow outer drum 18 having an end plate 19 and side walls 20, the end plate covering one end of the drum, is mounted on the sleeve 6 by means of central hub 21 having an aperture 22 therethrough. The hub 21 is mounted through end plate 19. A bearing 23 is positioned in aperture 22 and is mounted on sleeve 6 below the inner drum 9, whereby the outer drum 18 encompasses and is rotatable about the inner drum 9 on sleeve 6.

A worm wheel 24 is circumferentially mounted around the wall 20 of outer drum 18 and engages worm 25 mounted on a shaft 26 connected to motor 27. The motor operates to rotate the outer drum 18 on sleeve 6 by means of the worm gear 25 and worm wheel 24. A gear 28 is mounted on sleeve 6 below the outer drum 18. The outer drum 18 is provided with a terminal flange 29 at its lower end, the flange having its peripheral portion seated in the annular groove 4 of ring 2, with the flange 29 being rotatable within the groove 4 over bearing thrust buttons 30 circumferentially spaced inside the groove 4.

The outer drum 18 is provided with a terminal upper flange 31 having an enlargement 32 extending from a portion thereof. The enlargement 32 is provided with an aperture 33 with a bearing ring 34 seated therein. An elongated level winder rod 35 is journalled in bearing ring 34 and in journal box 36 mounted on flange 29, the journal box containing an apertured support 37 with a bearing ring 38 mounted therein and in which the rod 35 rotates. The end of the rod is connected through a planetary gear train comprising reduction gears 39, 40, 41 and 42 to the sleeve gear 28, whereby rotation of the drum 18 rotates the rod 35 at a reduced rate of speed. The rod 35 comprises interconnected forward and reverse helical grooves 43 and 44. Rider cylinders 45 and 46 are mounted on the rod 35, each spaced from the other longitudinally of rod 35 and each engaging one of the grooves 43 and 44 by means of rider pins 47 and 48. The rider cylinders are mounted in a follower or rider housing clamp 49. The housing clamp being split longitudinally throughout its length as at 50 and laterally partly through its thickness, as at 51, thereby forming two spaced clamp sections 52 and 53 with the rider cylinders each being encompassed by one of the clamp sections. A pair of ears 54 and 55 extent unidirectionally from both sides of the split 50 in each of the clamp sections. Shafts 56 and 57 interconnect the ears on both clamp sections. Gear sectors 58 and 59 are rotatably mounted one each on a shaft 56 and 57 with the gears of both gear sectors engaging each other. The ear connecting shafts 56 and 57 are each in threaded connection with the ears 54 and 55, one being threaded reverse to the other. Consequently, when the engaged gear sectors move in one direction, one of the shafts 56 and 57 converges one pair of ears 54 and 55 and spreads the other pair, whereby one of the riders 45 and 46 is clamped to its respective clamp section 52 or 53 with the other being freely rotatably slidable along the inner wall 60 and 61 of its respective clamp section.

An H-shaped yoke 62 is fixedly mounted on the end of ear shaft 56. As the outer drum 18 rotates, for example in a clock-wise direction, notch 63 of yoke 62 engages stop 64 when the housing clamp 49 reaches the top of the grooved rod 35. When the notch 63 engages stop 64, the yoke rotates ear shaft 56 causing gear sector 58 to activate gear sector 59, whereby rider 45 is unclamped from inner wall 60 and rider 46 is clamped to inner wall 61 causing the clamp housing to move downwardly. When the housing reaches the bottom of rod 35, the yoke notch 65 engages stop 66 and the housing is again caused to move upwardly on shaft 35. It is apparent that the yoke and gear sectors cause the clamp housing to move upwardly and downwardly and causes cable 67 to level wind on stationary drum 9. The stops 64 and 66 are mounted on an upright 68 and spaced vertically of each other.

The cable 67 is connected from a source of electrical energy and enters the cable reel assembly through aperture 5 of base plate 1, through the bore 7 of sleeve 6, is clamped to the bottom plate 12 by clamp 69 and passes through aperture 70 through the wall of drum 9, through aperture 71 formed through a guide member 72 mounted on clamp housing 49, wherefrom the cable 67 is level on drum 9 by means of level winder 49 as it is drawn through the housing clamp guide 72.

Various modifications of the invention are contemplated within the scope of the appended claims.

What is claimed is:

1. A cable reel assembly comprising a base, a sleeve extending outwardly of the base, a first inner drum fixed to the sleeve, a second outer rotatable drum rotatably mounted on the sleeve and encompassing the inner drum, means for rotating the outer drum around the inner drum, cable level winding means fixed to the outer rotatable drum, the level winding means comprising a grooved rod, a pair of rider members slidably mounted on the rod, clamp means connected to the rider members, linkage means connecting an end of said rod to said sleeve and means for alternately clamping first one and then the other rider members to the rod.

2. A cable reel assembly comprising a base, a sleeve extending outwardly of the base, a first inner drum fixed to the sleeve, a second outer rotatable drum rotatably mounted on the sleeve and encompassing the inner drum, means for rotating the outer drum around the inner drum, cable level winding means fixed to the outer rotatable drum, the level winding means comprising a grooved rod, a pair of rider members slidably mounted on the rod, clamp means connected to the rider members, and means for alternately clamping first one and then the other rider members to the rod, an upright member mounted on the base and spaced from the outer drum, stop means on said upright member, said stop means engaging said clamp means at predetermined positions of said rider members.

3. A cable reel assembly according to claim 1, comprising a gear member on the outer wall of said outer drum, and drive means connected to said gear member.

4. A cable reel assembly according to claim 1, comprising reduction gear linkage connected between said sleeve and said rod.

5. A cable reel assembly accordingly to claim 1, comprising, an annular ring mounted on said base, an annular groove in said ring facing the ring axis, a flange on said outer drum, the flange being rotatably mounted in said groove.

References Cited in the file of this patent

UNITED STATES PATENTS

| | | |
|---|---|---|
| 661,019 | McConnan | Oct. 30, 1900 |
| 1,187,827 | Gibbs | June 20, 1916 |
| 1,632,875 | Bouvier | June 21, 1927 |
| 2,437,725 | Conner | Mar. 16, 1948 |
| 2,941,746 | Hunt | June 21, 1960 |